Dec. 22, 1942.  W. L. HANSEN ET AL  2,305,963
STATOR FOR ALTERNATING CURRENT MOTORS
Original Filed July 3, 1939
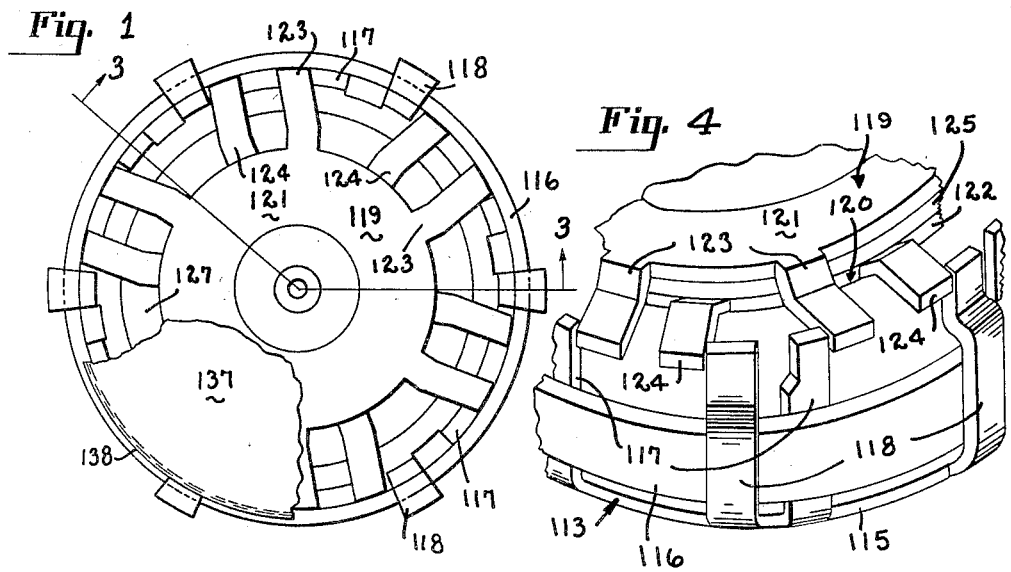
INVENTOR
WILLIAM L. HANSEN
BY IRA N. HURST
ATTORNEYS Patented Dec. 22, 1942

2,305,963

UNITED STATES PATENT OFFICE 2,305,963

STATOR FOR ALTERNATING CURRENT MOTORS

William L. Hansen and Ira N. Hurst, Princeton, Ind., assignors to Hansen Mfg. Company, Inc., Princeton, Ind., a corporation of Indiana Original application July 3, 1939, Serial No. 282,718. Divided and this application April 12, 1941, Serial No. 388,328

3 Claims. (Cl. 172—278)

This invention relates to electric motors, and in particular, to electrical synchronous motors such as are employed for operating clocks.

This application is a division of our copending application, Serial No. 282,718, filed July 3, 1939, now Patent No. 2,283,363, patented May 19, 1942.

One object of this invention is to provide a slow speed electrical synchronous motor having self-starting characteristics and a relatively low current consumption for a given power output.

Another object is to provide a slow speed self-starting synchronous motor having a radially thin axially elongated rotor, preferably with projections thereon.

Another object is to provide such a motor with a rotor constituting a cylindrical band with scalloped edges, and preferably with apertures adjacent the scalloped portions.

Another object is to provide a slow speed self-starting synchronous motor having a field structure consisting of a plurality of discs mounted upon a magnetic hub surrounded by a field coil, one set of discs mounted at one end of said hub having axially projecting pole pieces and two other discs mounted at the opposite end of the hub having radially projecting pole pieces, the tips of which extend into proximity to the tips of the axially projecting pole pieces, the discs with the radial pole pieces being separated by a disc of non-magnetic material for shading one set of poles from the other.

Another object is to provide a motor as set forth in the preceding object, wherein the axially directed poles are shaded by an annular band of non-magnetic material disposed with alternate poles passing on opposite sides of this band.

In the drawing:

Figure 1 is a top plan view of the improved motor according to the present invention, with the rotor removed and with a portion of the field structure broken away to disclose the structure therebeneath more clearly.

Figure 2 is a side elevation of the motor shown in Figure 1, with the rotor structure shown in diametrical cross section in order to disclose the field structure more clearly.

Figure 3 is an axial section through the motor of Figure 1, taken along the line 3—3 in Figure 1.

Figure 4 is an enlarged top perspective view of the motor of Figures 1, 2 and 3, with the rotor structure removed.

Figure 5 is a perspective view of one type of rotor assembly which may be employed in connection with the motor shown in Figures 1 to 4.

Referring to the drawing in detail, the improved motor consists of a magnetic hub 110 having reduced diameter portions 111 and 112. Mounted upon the portion 111 is an outer field pole assembly 113 having an aperture 114 closely surrounding the reduced diameter portion 111. The field pole assembly 113 consists of a disc-like portion 115 with axially directed alternating straight poles 117 and bent poles 118. This structure is surrounded by a shading coil 116 of non-magnetic metal, such as copper, and in the form of a cylindrical band passing alternately over the straight field poles 117 and under the bent field poles 118.

Similarly mounted on the opposite end of the magnetic hub 110 are the inner field pole assemblies 119 and 120, consisting of discs 121 and 122. The discs 121 and 122 have outwardly radiating pole pieces 123 and 124, respectively. The inner field pole assemblies 119 and 120 are separated axially from each other by a disc 125 of non-magnetic metal, preferably copper, thereby providing the effect of a shading coil. The field structure is energized by a field coil or winding 126 contained in an annularly grooved insulating member 127 surrounding the magnetic hub 110. The field coil 126 is provided with leads 128 and 129 for connection to a source of alternating current. The tips of the straight outer pole pieces 117 are arranged adjacent the tips of the inner pole pieces 123, with a slight air gap therebetween for providing a magnetic leakage path. Similarly, the tips of the bent outer pole pieces 118 are arranged adjacent the tips of the inner pole pieces 124, with a similar narrow air gap forming a magnetic leakage path.

The magnetic hub 110 is provided with a bore 130 having plugs 131 and 132 mounted therein, these plugs having bores 133 and 134, the walls of which rotatably support the rotor shaft 135. The latter is provided with a hub 136 having a rotor web 137, terminating in a flange 138 for receiving the rotor 139. The rotor 139 may consist of a cylindrical band of hardened magnetic steel in the form of a cylinder which is radially thin and axially wide. The rotor 139 may employ the plain band rotor 39, the scalloped band rotor 40 with or without the apertures 43. In Figure 5, the scalloped apertured rotor 40 is shown mounted within the flange 138 of the rotor web 137. In order to facilitate the rotation of the rotor, the shaft 135 may be provided with a plurality of washers 140 between the web 137 and the plug 132.

In the operation of the motor shown in Figures 1 to 5, the leads 128 and 129 are connected to a source of alternating current, such as to the 110-volt 60-cycle alternating current supply for domestic lighting. Energization of the field coil 126 causes the magnetization of the field poles 117, 118, 123 and 124 in alternate polarity as the current alternates. The shading coils 116 and 125, however, provide a phase lag in alternate outer and inner field poles so as to impart a starting torque to the rotor 139. By this means the rotor 139 is started in rotation and rotates at a synchronized speed, depending upon the number of poles with which the motor is provided. In the example shown, the motor has a speed of 600 revolutions per minute for 110-volt 60-cycle alternating current.

It has been found by actual test that the motor of this invention, which in the form shown has a speed of 600 revolutions per minute, possesses an unusually low current consumption, in the neighborhood of 3 watts as compared with prior-art motors having current consumption running as high as 6 watts. At the same time the motor possesses adequate power. One motor of this invention, for example, was able to pull fifteen ounces of weight mounted on a lever one inch long, with a current consumption of 35 milliamperes.

It will be understood that we desire to comprehend within our invention such modifications as come within the scope of the claims and the invention.

Having thus fully described our invention, what we claim as new and desire to secure by Letters Patent is:

1. In a synchronous motor, a magnetic core, an outer magnetic field member mounted on one end of said core and having outer pole pieces disposed axially in a substantially cylindrical path and a pair of inner magnetic field members mounted in spaced relationship on the other end of said core and having inner pole pieces extending radially outward with their tips bent substantially into the same plane, said inner pole piece tips being disposed adjacent the tips of said outer pole pieces, a field energizing winding associated with said core, a rotor rotatably mounted adjacent said tips of said pole pieces, and an outer shading member adjacent said cylindrical path of said outer pole pieces and passing over alternate outer pole pieces and beneath the remaining outer pole pieces, the outer pole pieces outside said shading member being bent around said shading member with their tips disposed substantially in the same cylindrical path with the tips of the outer pole pieces inside said shading member.

2. In a synchronous motor, a magnetic core, an outer magnetic field member mounted on one end of said core and having outer pole pieces disposed axially in a substantially cylindrical path, whereby said pole pieces extend in the same direction as the magnetic core, and a pair of inner magnetic field members mounted in spaced relationship on the other end of said core, a lag plate interposed between said inner magnetic field members, the latter extending radially outward with their tips bent substantially into a single plane which is positioned intermediate the thickness of said lag plate whereby the inner pole pieces extend in a direction at right angles to the direction of said core, said inner pole piece tips being disposed adjacent the tips of said outer pole pieces, a field energizing winding associated with said core, and a rotor for said motor surrounding the exterior axial surfaces of the outer pole pieces and also surrounding the ends of the inner pole piece tips.

3. In a synchronous motor, a magnetic core, an outer magnetic field member mounted on one end of said core and having outer pole pieces disposed axially in a substantially cylindrical path and a pair of inner magnetic field members mounted in spaced relationship on the other end of said core and having inner pole pieces extending radially outward, the pole pieces of one of said inner members being bent upwardly and the pole pieces of the other of said inner members being bent downwardly in order to position the tips in the same plane, said inner pole piece tips being disposed adjacent the tips of said outer pole pieces, the alternate outer pole pieces being bent to receive a shading coil, a field energizing winding associated with said core, and a rotor rotatably mounted adjacent the tips of all of said pole pieces.

WILLIAM L. HANSEN.
IRA N. HURST.